TWISTOR ASSOCIATIVE MEMORY SYSTEM

Filed May 31, 1963 4 Sheets-Sheet 1

INVENTOR.
EDWIN S. LEE, III
BY
Christie, Parker & Hale
ATTORNEYS

Oct. 29, 1968 E. S. LEE III 3,408,635

TWISTOR ASSOCIATIVE MEMORY SYSTEM

Filed May 31, 1963 4 Sheets-Sheet 2

INVENTOR.
EDWIN S. LEE, III
BY
Christie, Parker & Hale
ATTORNEYS.

INVENTOR.
EDWIN S. LEE, III
BY Christie, Parker & Hale
ATTORNEYS.

United States Patent Office 3,408,635

Patented Oct. 29, 1968

3,408,635

TWISTOR ASSOCIATIVE MEMORY SYSTEM

Edwin S. Lee III, Altadena, Calif., assignor to Burroughs Corporation, Detroit, Mich., a corporation of Michigan Filed May 31, 1963, Ser. No. 284,658
22 Claims. (Cl. 340—174)

This invention relates to storage apparatus and, more particularly, to a direct access memory system.

The use of arrays of magnetic elements, such as magnetic cores, to store coded information in computer systems and the like is well known. Generally, the magnetic elements are arranged in a predetermined configuration, such as a row-column array, and the coded information is assigned to and stored in particular row-column positions in the array designated by preselected codes termed "addresses." In such conventional storage apparatus, to retrieve coded information from the array, an operator must first determine the address of the coded information, usually by reference to a correlation table or chart. The operator then utilizes the address to institute the energizing of the particular row-column position in which the coded information is stored to read the information out of storage. This process is repeated by the operator for each retrieval operation.

The time required for the operator to determine the address of particular coded information represents wasted time as far as the over-all computer is concerned; comprises a material portion of the operator's time in programming the computer's operation; and in some cases poses a restrictive limitation upon the rate at which information may be processed in the computer system.

In view of the above, and in order to reduce the time required to retrieve magnetically stored information, there has recently been developed a magnetic storage apparatus which permits direct access to stored information thereby eliminating the requirement of maintaining or referring to a correlation chart to retrieve coded information.

One such storage apparatus is the subject of the copending patent application Ser. No. 780,056, filed Dec. 12, 1958, and assigned to the same assignee as the present invention.

Briefly, as described therein, the storage apparatus comprises an identification storage and a memory storage. The identification storage automatically performs the charting and correlation functions previously performed by the operator and includes a plurality of transfluxor core elements arranged in a row-column array. The memory storage includes a conventional row-column array of magnetic cores. Each binary coded word to be stored in the storage apparatus has associated therewith a particular identification binary code or tag.

Utilizing conventional coincident current writing techniques, each coded word is written in a different row of the memory storage simultaneous with its tag being written into an associated row in the identification storage. The tags stored in the identification storage are represented by an unblocked transfluxor for a binary one and a blocked transfluxor for a binary zero.

To retrieve a particular coded word from the memory storage, the tag for the word is stored in a compare register having a plurality of outputs one feeding each of the column conductors of the identification storage. At a predetermined time the compare register is energized to excite the column conductors of the identification storage and simultaneously apply the binary coded tag to a bias generator.

The bias generator is coupled in series circuit relationship with the output winding of each row of transfluxors in the identification storage and develops an output signal on each output winding having a magnitude proportional to the number of binary characters of a predetermined binary value in the tag.

The output signal developed by the bias generator is added to the output signals generated in the output winding of each row of transfluxors in the identification storage to develop a resultant output signal on each output winding. Due to the magnitude and polarity of the output signal generated by the bias generator, a discrete resultant output signal is developed in only the output winding for the row of transfluxors in which a match occurs between the tag stored in the given row and the tag stored in the compare register. The discrete output signal is then utilized to directly read the desired coded word out of the memory storage.

Since transfluxor core elements may be interrogated without destroying the information stored therein, the retrieval operation for particular information stored in the memory storage may be repeated for each word in the memory storage without varying the tag information stored in the identification storage.

As described, the identification storage of transfluxors, together with the compare register and bias generator, form a comparing circuit which functions to directly locate the position of binary coded tag information stored in the identification storage and hence the corresponding location of binary coded word information in the memory storage. Thus, the comparing circuit is the heart of the direct access storage apparatus. In practice, however, since the identification storage employs a plurality of separate transfluxor core elements in a row-column array, the over-all comparing circuit is relatively expensive to implement—each core element requiring separate and careful selection, winding, testing and mounting.

In view of this, the present invention provides a comparing circuit which is relatively compact and simple in design, particularly adapted to use in a direct access storage apparatus and which is accurate in operation, and inexpensive to implement.

To accomplish this the present invention employs a plurality of twistors arranged in a novel manner to provide a comparing circuit.

Briefly, a twistor is a magnetic storage device which comprises a central conductor having a thin strip of magnetic material helically wound therearound. Due to the physical arrangement of a twistor it possesses an "easy" and a "hard" direction of magnetization, namely, along and transverse to the helical direction of the magnetic strip as wrapped around the conductor.

Coded information may be stored in a twistor by controlling the helical direction of magnetic flux along the conductor. Coded information stored in a twistor may be read therefrom as a voltage across the conductor by either applying a current to the conductor itself or by passing a current around the conductor to reverse the helical direction of magnetic flux along the conductor. In addition to the ease with which coded information may be stored and read from a twistor, twistors are simple to individually construct and arrange in any desired array, include a small volume of magnetic material relative to equivalent magnetic core arrangements, and require a relatively small signal power to store information therein.

The above features and advantages of twistors are incorporated, in a novel manner, into the comparing circuit of the present invention.

Briefly, the comparing circuit of the present invention includes means for selectively storing a plurality of coded words in a plurality of twistors together with means for simultaneously comparing each stored word with a coded input word to develop a discrete output voltage at an output means associated with each twistor storing a word which matches the input word.

More particularly, a basic form of the comparing circuit of the present invention includes a plurality of pairs of first and second twistors having series connected central conductors. The free ends of the central conductors of each pair are coupled to a different output means for sensing voltage signals developed within the conductors. The second twistor of each pair is preset such that magnetic flux extends in a predetermined helical direction along the central conductor thereof while the first twistor of each pair is arranged to store a coded word or tag.

A word is stored in each first twistor by a first binary input means arranged to selectively set magnetic flux in opposite directions along a plurality of pairs of helical portions of the conductors of the first twistors. Each bit of the word stored in a first twistor is stored by a different pair of helical portions. For example, a binary one may be represented by a relative clockwise and a relative counter-clockwise direction of magnetic flux in adjacent helical portions of the conductor while a binary zero may be represented by opposite relative directions of magnetic flux in adjacent helical portions of the conductor.

The coded words stored in the first twistors are simultaneously compared with a binary coded input word without varying the content of the stored words, by a second binary input means. The second binary input means is responsive to the binary coded input word, each bit of which is associated with a different bit of each word stored by the first twistors. For each bit of the input word the second input means includes means for selectively passing a current signal about the conductor of each twistor and over a segment of one of the helical portions of each pair of helical portions storing the bit associated with the bit in the input word. The particular one of the helical portions storing the bit associated with the bit in the input word is determined by the binary value of the bit in the input word. Thus, when the bit of the input word is of a binary one value the current signal is passed over a predetermined one of the helical portions of each pair of helical portions storing the bit associated with the bit in the input word while when the bit is of a binary zero value the current signal is passed over the other helical portion of each pair of helical portions storing the bit associated with the bit in the input word. In this manner, each current passing means is arranged to produce a voltage of predetermined magnitude in the conductor of each first twistor when a match exists between the binary value of a bit of the input word and the binary value of an associated bit stored by the first twistor and to generate in the conductor of each second twistor a voltage equal in magnitude and opposite in polarity to the voltage developed in the series connected conductor of the first twistor when said match occurs. With this arrangement a discrete output voltage is developed at only those output means associated with a pair of twistors in which an exact match exists between the word stored therein and the binary coded input word.

Thus, the comparing circuit of the present invention, while incorporating the aforementioned features of twistors, may be arranged to directly locate the position of a binary coded tag stored in a plurality of twistors by matching the stored tag with like input signal to generate a discrete location output signal at the output means where the information is stored. When the comparing circuit is combined with a memory storage to provide a direct access storage apparatus, a discrete location output signal also produces a direct indication of the location of binary coded information in the memory storage.

Since the comparing operation of the present invention does not destroy or vary the word content stored in the plurality of twistors, the retrieval operation for particular information stored in the memory storage may be repeated for each word in the memory storage without rewriting the information stored in the comparing circuit.

The above, as well as other features of the present invention, may be more clearly understood by reference to the following detailed description when considered with the drawings in which.

Figure 1:
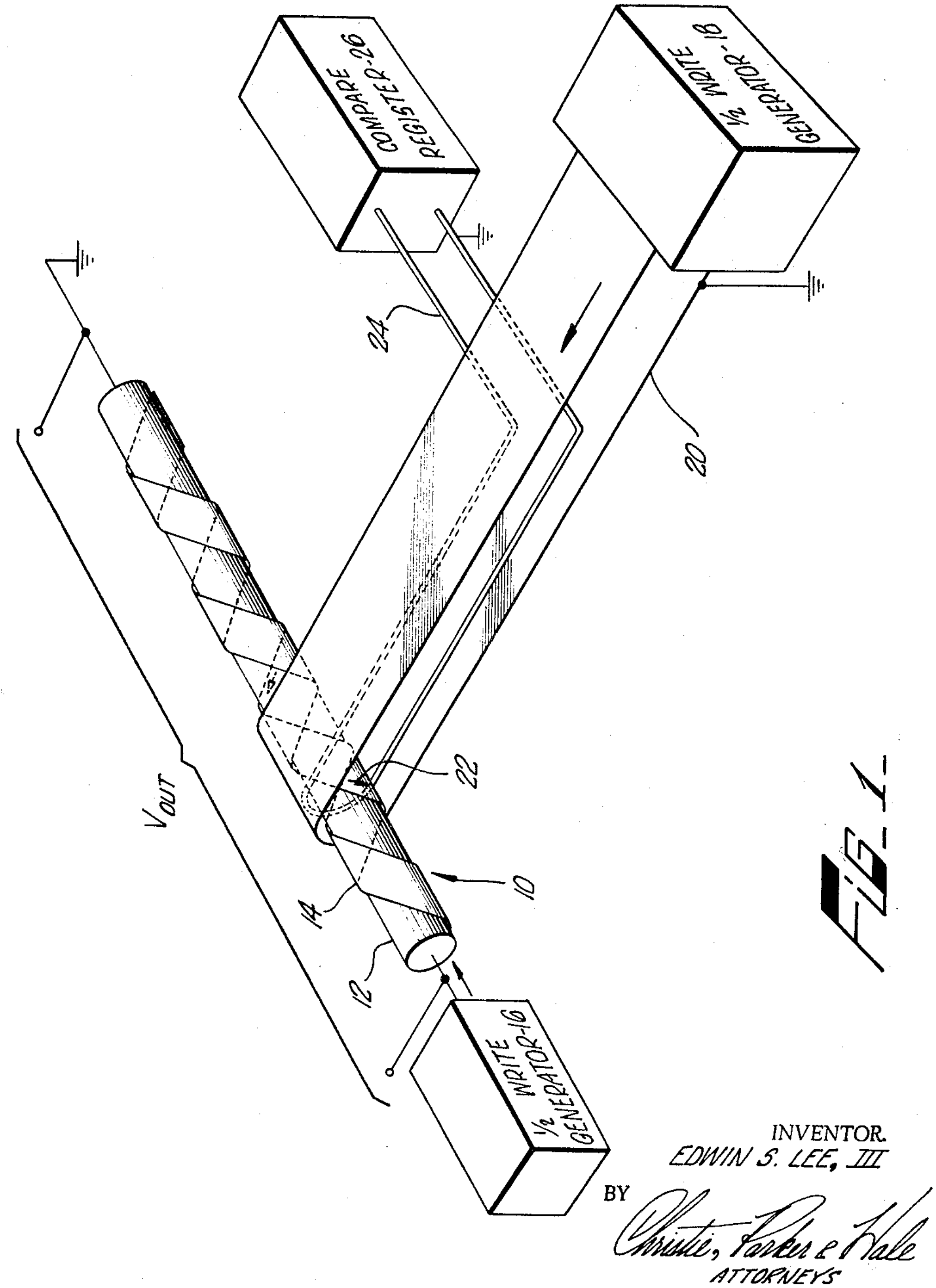
FIGURE 1 is a diagrammatic representation of a twistor and an associated means for writing and reading coded information.

As described briefly above, the present invention comprises a plurality of twistors arranged in a novel comparing circuit configuration. Briefly, as represented in FIGURE 1, a twistor 10 includes a central electrical conductor 12 having a thin strip of magnetic material 14 wound helically therearound. Preferably, the helical wrap of the strip 14 makes a 45° angle with the longitudinal axis of the central conductor 12. Due to the physical arrangement of the twistor 10 it possesses an "easy" and a "hard" direction of magnetization, namely along and transverse to the helical direction of the magnetic strip as wrapped around the conductor.

Binary coded information may be stored in the twistor 10 by controlling the helical direction of magnetic flux along the conductor 10. In particular, by simultaneously passing a current signal along and around the central conductor a bit of binary information may be stored in the twistor 10, the value of the bit being represented by the helical direction of the magnetic flux along the conductor 12. For example, a binary one may be represented by a counter-clockwise helical direction of magnetic flux along the conductor 12 while a binary zero may be represented by a clockwise helical direction of magnetic flux along the conductor.

To provide such coincident current writing of binary information into the twistor 10 the arrangemnet illustrated in FIGURE 1 includes, by way of example, a pair of half-write generators 16 and 18. The half-write generators may comprise selectively controllable current sources for applying current signals to the twistor 10. The magnitude of the current signals applied by the half-write generators is insufficient in and of themselves to control the direction of magnetization within the twistor, however, when simultaneously applied to the twistor they provide the means for selectively controlling the direction of magnetic flux along the conductor 10.

The half-write generator 16 is coupled to one end of the central conductor 12, while the other end of the central conductor 12 is grounded. The half-write generator 18 is electrically coupled to a conductor 20. The conductor 20 may comprise a solenoid or a sheet of electrical conductive material as illustrated. The conductor 20 is passed over and around the surface of the twistor 10. When the half-write generators are simultaneously excited currents are passed axially along and around the central conductor 12 to produce axial and circular magnetic fields about the conductor 12. In the arrangement illustrated in FIGURE 1, the axial and circular fields combine to produce a magnetization along the helical portion of the conductor 12 defined by the strip 14 under and about the conductor 20 in a counter-clockwise direction as represented by the arrow 22. In accordance with the example above, the counter-clockwise direction of magnetic flux along the helical portion of the conductor 10 stores a binary one bit of information.

The binary information stored in the twistor 10 may be retrieved by passing a current signal through or around the conductor 12 to reverse the helical direction of magnetic flux therein and generate a voltage signal between the ends of the central conductor represented as $V_{out}$.

In the present invention, it is desired to read the binary coded information stored within a twistor without destroying or varying its contents. To accomplish this the present invention employs a read-out arrangement including a relatively thin conductor 24 passing around the twistor within the loop of the conductor 20. The conductor 24 is coupled to ground and to a compare register 26. The compare register may take the form of a bistable switching circuit such as a conventional flip-flop having two stable states. In a first stable state the compare register may produce a relative counter-clockwise current flow through the conductor 24 about the twistor 10 while in its second stable state the compare register may produce a relative clockwise current flow about the twistor 10. By selecting a clockwise direction of current flow to represent a binary one and a counter-clockwise direction of current flow to represent a binary zero, the compare register 26 provides means producing an output voltage in the twistor 10 indicative of the binary coded bit of the information stored therein and due to the arrangement of the conductor 24 relative to the conductor 20, does not destroy the information while developing the desired output voltage.

For example, when a binary one signal is generated by the compare register 26 and the direction of magnetic flux is as illustrated in FIGURE 1 (the twistor storing a binary one) the direction of magnetic flux is reversed by a large current flowing in the conductor 24 to produce a voltage of predetermined magnitude at the terminals of the conductor 10. If a current signal representing a binary zero is developed in the compare register 26, the direction of magnetic flux is not changed and a relatively small noise signal is developed at the output terminals of the conductor 12. In a similar manner, if a binary zero were stored in the twistor 10 a voltage of predetermined magnitude would be developed between the output terminals when a current signal representing a binary zero is applied through the conductor 24 around the conductor 12.

In the arrangement illustrated in FIGURE 1, when a current signal representing a binary one is applied to the conductor 24 and passed around the conductor 10 it reverses the direction of magnetic flux only within a small segment of the helical portion under the conductor 22. At the cessation of the current signal in the conductor 24, helical regions adjacent the segment are magnetized in an opposite direction relative to the segment. The magnetizing force exerted by the adjacent large portions is sufficient to reutrn the segment to its original direction of magnetization shortly after the cessation of the current signal. Thus, the information stored within the twistor and represented by the helical direction of flux within the helical portion of the conductor 12 under the conductor 20 remains unchanged by the comparing operation.

Figure 3:
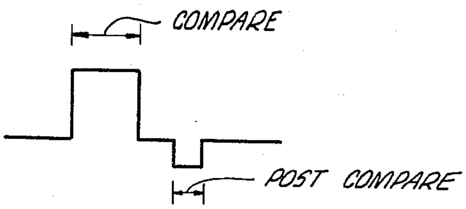
FIGURE 3 is a schematic representation of the waveform of the current signal developed by the second binary input means for each bit of an input word.

To aid in the nondestructive reading of the binary information stored in the twistor, the compare register 26 may be arranged to develop a current signal having a waveform similar to that illustrated in FIGURE 3. Thus, when it is desired to compare the binary value of the information stored in the twistor with that represented by the current signal generated in the compare register 26, the current signal having both a compare and a post-compare portion of opposite polarity is applied to the conductor 24. During the compare portion of the current signal the direction of magnetization over a segment of the magnetized helical portions is reversed. When the post-compare portion of the current signal is applied to the conductor 24 a reverse current is developed which aids in returning the direction of magnetization to its original direction.

Many articles have been published about twistors since their discovery in 1957 by A. H. Bobeck. Thus, for a further understanding of the physical characteristics and mode of operation of the twistor, reference may be made to the original article by Mr. Bobeck appearing in the Bell System Technical Journal, Volume 36, pages 1319–1340, November 1957, or an article also by Mr. Bobeck appearing in the November 1959 issue of the Bell Laboratories Record, pages 406–410, or to a more recent article by Mr. Phillip M. McCabe appearing in the July 1961 edition of Instruments and Control Systems, pages 1242–1245, the contents of each of which is hereby incorporated by reference.

Figure 2:
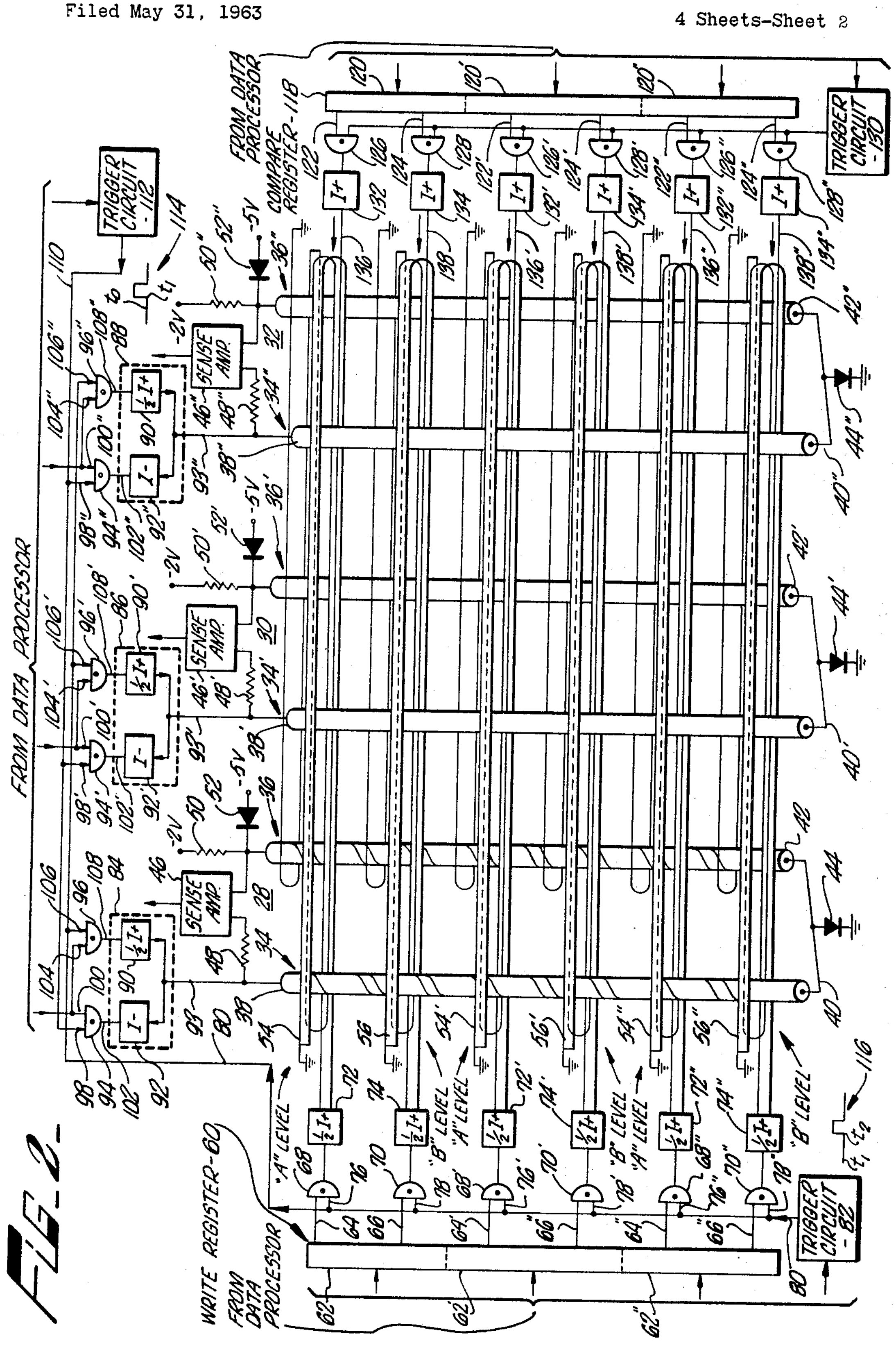
FIGURE 2 is a diagrammatic representation of one form of the magnetic storage of the present invention.

The basic teachigs presented above as to FIGURE 1 are incorporated by the present invention to provide a comparing circuit for simultaneously comparing a binary coded input word with a plurality of stored words to provide a direct indication of the location of matching stored words. One form of such a comparing circuit is illustrated in FIGURE 2. The comparing circuit includes a plurality of pairs of twistors. In the form illustrated in FIGURE 2, three pairs of twistors 28, 30 and 32 are represented. Each pair of twistors is substantially the same, therefore only the pair of twistors 28 will be described in detail with like characters with prime and double prime notations being utilized for corresponding parts and associated elements of the twistors pairs 30 and 32. The twistor pair 28 includes a first or word storing twistor 34 and a second or bias twistor 36. The word twistor 34 includes a central conductor 38 which is connected in series by a lead 40 to a central conductor 42 of the bias twistor 36. The lead 40 is coupled to ground through a diode 44. The free end of the central conductor 38 is coupled through a resistor 48 to one input terminal of a sense amplifier 46 while the free end of the conductor 42 is directly connected to a second input terminal of the sense amplifier 46. The sense amplifier 46 may be of any conventional design possessing relatively high impput impedance and functions to amplify the voltage developed across the series connected conductors 38 and 42.

The conductor 42, in addition to being connected to the sense amplifier 46, is also coupled through a resistor 50 to a first source of negative voltage (−2 volts) and through a diode 52 to a second source of negative voltage (−5 volts). The resistor 50 possesses a high resistance value of the order of 10,000 ohms while the diode 52 is arranged as illustrated with its cathode coupled to the conductor 42.

To selectively store binary coded words in the word twistors 38, the comparing circuit of the present invention includes a first binary input means for setting magnetic flux in opposite directions in a plurality of pairs of helical portions along each word storing twistor. In the apparatus illustrated in FIGURE 2, the first binary input means employs coincident current writing techniques similar to those previously described in connection with FIGURE 1, and includes a plurality of pairs of conductive strips or solenoids, one pair for each bit in the word to be stored in the word storing twistors 38. By way of example only, three pairs of such conductive strips are employed to store a three-bit word in each word storing twistor 38 of the comparing circuit. Each pair of conductive strips is arranged in substantially the same manner. Accordingly, only the upper pair of conductive strips will be described in detail with corresponding characters with prime and double prime symbols representing the lower pairs of conductive strips and the circuitry connected thereto.

As illustrated, the upper pair includes conductive strips 54 and 56. The conductive strips 54 and 56 are arranged to pass around adjacent portions of the conductors 38 designated by A and B levels, respectively. The conductive strips 54 and 56 function similar to the conductor 20 described in connection with FIGURE 1 to provide means for passing a current signal about helical portions of the word storing twistors 34. As will be hereinafter described in detail, the current signals passed by the conductive strips combine with a current signal flowing in the conductor to provide means for selectively controlling the direction of magnetic flux along helical portions of the conductor 38 under the conductive strips.

Each pair of conductive strips is electrically coupled to a different cell of a write register 60. The write register 60 may comprise a plurality of bistable trigger circuits, such as conventional flip-flops, having first and second stable states and a pair of outputs. The write register 60 is arranged to receive information from an associated data processor to control the state of each cell therein and to generate a predetermined output signal at each output terminal. Each cell of the write register 60 and the circuitry associated therewith is substantially the same. Each cell is associated with a different pair of A and B levels for the word storing twistors 34. Accordingly, only the upper cell 62 of the write register 60 together with the associated circuitry coupling the cell 62 to the conductive strips 54 and 56 will be described in detail with corresponding elements for the remaining cells and associated circuitry being designated by similar characters with prime and double prime notations.

As represented, the upper cell 62 of the write register 60 includes a pair of output leads 64 and 66. When the cell 62 is in a first stable state a high voltage signal is developed on the output lead 64 relative to the output lead 66. Similarly when the cell 62 is in its second stable state a high voltage signal is developed on the output lead 66 relative to the output lead 64. The first and second stable states of the cell 62 may designate a binary zero and a binary one bit of information respectively. The value of the bit of information is under control of signals received from a data processor which selectively switches the cell 62 between its first and second stable states. In a similar manner, the state of each other cell in the write register 60 is also controlled by information from the data processor.

The circuitry coupling the cell 62 to the conductive strips 54 and 56 includes a pair of AND gates 68 and 70 coupled in series with a pair of half-write current generators 72 and 74, respectively. The output lead 64 is coupled to one input of the AND gate 68 while the output lead 66 is coupled to one input of the AND gate 70. The remaining inputs 76 and 78 of the AND gates 68 and 70, respectively, are coupled to an output lead 80 to receive high level pulse signals from a trigger circuit 82. The AND gates 68 and 70 are arranged to pass a high voltage signal to the associated current generators 72 and 74 when high level voltages are simultaneously applied to the respective input terminals.

The half-write current generators 72 and 74 are coupled to the conductive strips 54 and 56, respectively, and are arranged to respond to the high level voltages passed by the respective AND gates 68 and 70 to generate current signals. Thus, when the cell 60 is in its first stable state, representative of a binary zero, and a pulse is generated by the trigger circuit 82, the AND gate 76 passes a high voltage signal to excite the half-write current generator 72 and pass a current signal through the conductive strip 54 to ground. When the cell 60 is in its second stable state, representative of a binary one, and a pulse is generated by the trigger circuit 82, the AND gate 78 passes a high voltage signal to excite the half-write current generator 74 to pass a current signal through the conductive strips 56 to ground.

The current signal developed by the half-write current generator 72, when the cell 62 represents a binary zero, passes through the conductive strip 54 to ground in a counter-clockwise direction about the A level of each word storing twistor 34. The current signal generated by the half-write current generator 74, when the cell 62 represents a binary one, passes through the conductive strip 56 to ground in a counter-clockwise direction about the B level of each word storing twistor 34. The current signals generated by the half-write current generators 72 and 74 in passing about the twistors 34 produce downward axial magnetic fields within the conductors 38. Due to the magnitude of the current signals, however, the axial magnetic fields are insufficient, in and of themselves, to set magnetic flux in the helical direction about the A and B levels in the conductors 38. Thus, similar to the arrangement previously described in connection with FIGURE 1, additional means are required to selectively set magnetic flux in helical directions about the conductors 38.

In the first binary input means illustrated in FIGURE 2, the additional means includes a plurality of half-write and preset units 84, 86 and 88, one for each twistor pair 28, 30 and 32. Each half-write and preset unit is substantially the same. Therefore only unit 84 and its associated circuitry will be described in detail, the components of the remaining units and associated circuitry being designated by similar characters with prime and double prime notations.

As illustrated, the half-write and preset unit 84 includes a half-write current generator 90 and a preset current generator 92 having a common output lead 93 coupled to the central conductor 38 of the twistor 34. The current generators 90 and 92 are of conventional design having a relatively low impedance when conductive and an extremely high input impedance when nonconductive. The half-write current generator 92 may comprise a one-shot multivibrator which when energized, forward biases the diode 52, reverse biases the diode 44, and causes a current to pass from the source of negative potential (−5 volts) through the central conductors 42 and 38 to the current generator 92. The magnitude of the current signal generated by the current generator 92 is sufficient to preset the direction of magnetic flux both in the bias twistor 36 and the word twistor 34. Since the central conductors 42 and 38 are connected in a series circuit, the current generated by the current generator 92 passes in relative opposite directions in the twistors 34 and 36 to preset magnetic flux in opposite helical directions therein. For example, the direction of the magnetic flux on the bias twistor 36 is in a counter-clockwise helical direction while the magnetic flux is preset in a clockwise helical direction in the word twistor 34.

The half-write current generator 90 may also comprise a one-shot multivibrator which, when energized, forward biases the diode 44, reverse biases the diode 52, and develops a current signal which passes through the conductor 38 to ground. The current passing through the conductor generates a circular magnetic field about the conductor. Due to the magnitude of the current signal generated by the current generator 90, the circular magnetic field is insufficient in and of itself to set the magnetic flux in a helical direction about the conductor 38. However, when the circular magnetic field is combined with the axial magnetic field developed by current flow in a conductive strip 54 or 56, a resultant magnetic field is developed which is capable of setting magnetic flux along a helical direction within an associated A or B level of the word storing twistor 34. In this manner, the half-write current generators 90, 72 and 74 combine with the central conductor 38 and the conductive strips 54 and 56 to provide means for selectively storing binary coded information in the word storing twistor 34 by selectively setting magnetic flux in opposite directions in a plurality of pairs of helical portions along the word storing twistor. For example, a bit of binary coded one value is represented by a clockwise helical direction of magnetic flux and a counter-clockwise helical direction of magnetic flux in the A and B levels, respectively, of the word storing twistor 34 while a bit of binary coded zero value is represented by a counter-clockwise helical direction of magnetic flux and a clockwise helical direction of magnetic flux in the A and B levels, respectively, of the word storing twistor 34 (see FIGURE 4).

The operation of the current generators 90 and 92 is under the selective control of the associated data processor through a pair of AND gates 94 and 96. The AND gate 94 has a pair of input terminals 98 and 100 and an output terminal 102 which is coupled to the current generator 92. The AND gate 96 includes a pair of input terminals 104 and 106 and an output terminal 108 coupled to the half-write current generator 90.

The AND gates are arranged to pass a high voltage signal to excite the associated current generators 90 and 92 when high level voltage signals are simultaneously applied to the input terminals thereof. The input terminal 98 of the AND gate 94 is coupled to an output lead 110 of a trigger circuit 112 to receive a high level voltage pulse generated by the trigger circuit 112. The input terminal 106 of the AND gate 96 is coupled to the output lead 80 of the trigger circuit 82. The input terminals 100 and 104 of the AND gates 94 and 96, respectively, are coupled in common to receive an input signal from the data processor.

Thus, in the over-all operation of the first binary input means to selectively store a binary coded word in the word storing twistor 34, at a time $t_0$ information signals are simultaneously applied to the input terminals 100 and 104 of the AND gates 94 and 96, the trigger circuits 82 and 112, and to the write register 60 from the data processor. Assuming that only the twistor 34 is to store the particular word input of the register 60, only the input signal to the AND gates 94 and 96 is of a high voltage level. In response to the input signal to the trigger circuit 112, which may be a single-shot multivibrator, the trigger circuit generates a high level voltage signal at a time $t_1$, as illustrated by the waveform 114. Thus, at $t_1$ high level voltage signals are simultaneously applied to the input terminals 98 and 100 of the AND gate 94. The AND gate 94 operates to pass a high level voltage signal to energize the current generator 92. The energizing of the current generator 92 produces a presetting of the direction of magnetic flux in the twistors 36 and 34 as previously described.

At the termination of the pulse signal generated by the trigger circuit 112, the current generator 92 returns to its normally nonconductive state. The direction of magnetic flux in the twistors 36 and 34, however, remains in the preset condition.

The signal from the data processor applied to the trigger circuit 82 excites the trigger circuit, which may comprise a one-shot multivibrator having a predetermined time delay built therein, to generate a high voltage pulse at a time $t_2$ which occurs after the termination of the pulse signal generated by the trigger circuit 112. The waveform of the voltage pulse generated by the trigger circuit 82 is represented at 116.

Thus, at $t_2$ a high level voltage signal is simultaneously applied to the AND gates 68 and 70 and to the terminal 106 of the AND gate 96. Accordingly, high level voltage signals are simultaneously applied to the input terminals 104 and 106 of the AND gate 96 at $t_2$ to pass a high level voltage signal which excites the half-write current generator 90. Also, at $t_2$ high voltage signals are simultaneously applied to both input terminals of particular ones of the AND gates 68 and 70 depending upon the binary word information to be stored in the word storing twistor 34. For example, if the binary word 101 is to be stored in the twistor 34 the signals from the data processor are such as to cause the output leads 66, 64′ and 66″ to be excited to a high voltage level relative to the output leads 64, 66′ and 64″. In such an arrangement, high level voltage signals are simultaneously applied to both input terminals of the AND gates 70, 68′ and 70″ which pass high voltage signals to excite the half-write current generators 74, 72′ and 74″ simultaneous with the exciting of the half-write current generator 84.

Thus, at $t_2$ current signals are simultaneously passed through the conductive strips 56, 54′ and 56″ about the conductor 38 and through the conductor 38 to ground. The current signals produce the aforedescribed axial and circular magnetic fields which combine to produce a resultant magnetic field sufficient to set magnetic flux in a helical direction about particular portions of the conductor 38. In particular, in the B level of the conductor 38 associated with the conductive strip 56, the resultant magnetic field produces a reversal of the direction of magnetic flux to a counter-clockwise helical direction. A similar result occurs in the A level associated with the conductive strip 54′ and in the B level associated with the conductive strip 56′. By such a selective reversing of the direction of magnetic flux in certain levels of the conductor 38 the binary coded bits 101 are selectively stored in adjacent pairs of helical portions of the twistor 34, the binary one being represented by a clockwise helical direction of magnetic flux in the A and a counter-clockwise helical direction of magnetic flux in the B level and a binary zero being represented by a counter-clockwise helical direction of magnetic flux in the A level and a clockwise helical direction of magnetic flux in the B level. In this regard, reference may be made to the chart of FIGURE 4 which, in the first row of curved arrows, depicts the relative helical directions of magnetic flux for the storage of a binary one and a binary zero bit in the word storing twistor as well as the preset helical direction of magnetic flux in the bias twistor 36.

Different binary coded words may be stored in each of the remaining word storing twistors 34′ and 34″ by repeating the above writing operation for the twistor pairs 30 and 32. Since, for the nonselected word storing twistor 34 only half-write currents are passed therearound during the writing of information into the selected word storing twistor, the information previously stored therein is not affected.

Once a complete set of bits are written into the comparing circuit, the comparing circuit is then ready to simultaneously perform a plurality of comparing operations of a binary coded input word with each binary coded stored in the comparing circuit.

To provide for such a selective and simultaneous comparing operation the comparing circuit illustrated in FIGURE 2 includes a second binary input means. Briefly, the second binary input means is responsive to a binary coded input word, each bit of which is associated with a different bit in each of the words stored by the word storing twistors of the comparing circuit. For each bit in the input word, the second binary input means includes apparatus for passing a current signal about the conductor of each twistor and over a segment of one of the levels associated with the bit. The current signal passes around the conductors in a manner to generate a voltage signal in the conductor of each word storing twistor of predetermined magnitude when a match exists between the bits of the input word and the associated bits stored in the word storing twistor and to generate a voltage signal in the conductor of the bias twistor which is equal in magnitude and opposite in polarity to the voltage developed in the conductor of the associated word storing twistor when said match occurs. In the second binary input means this operation occurs for each bit of the binary coded input word. Therefore, a discrete output voltage is developed across the series connected word storing and bias twistor only when an exact match occurs between the binary value of the input word and the binary value of the word stored in the associated word storing twistor.

In the comparing circuit of FIGURE 2, the second binary input means is illustrated, by way of example only, as including a compare register 118 having a plurality of cells 120, 120′ and 120″, one for each pair of A and B levels of the comparing circuit. The cells may each comprise a bistable circuit, such as a conventional flip-flop, having first and second stable states and a pair of output leads 122 and 124. The compare register 118 is arranged to receive the binary coded input word which is to be compared simultaneously with each word stored in the comparing circuit. Each bit of the input word is applied to a different cell of the compare register. When a cell receives an input bit of binary one value it assumes one of its stable states and produces a relatively high output voltage on its output lead 124. When a cell of the compare register receives an input bit of binary zero value it assumes a second stable state and produces a relatively high output voltage on its output lead 122.

As described, each cell of the register 118 is associated with a different pair of A and B levels of the comparing circuit. More particularly, each cell, and hence each bit of the coded input word, is associated with the same bit in each word stored in all the word storing twistors 34. Thus, the bit of the input applied to the cell 120 is associated with the upper bit stored by each word storing twistor 34. The circuit means providing such an association as well as means for selectively passing current signals about the twistors to generate voltage signals indicative of a match or no-match condition between the input and stored words is the same for each cell of the register 118. Accordingly, only the circuitry associated with the upper A and B levels and the cell 120 of the compare register 118 will be described in detail, the corresponding circuitry for the other levels of the comparing circuit being denoted by similar characters having a prime and double prime notation.

As illustrated, the output lead 122 of the cell 120 is coupled to an AND gate 126 while the output lead 124 is coupled to an AND gate 128. The AND gates 126 and 128 also receive a high level voltage pulse from a trigger circuit 130. The AND gates 126 and 128 are arranged to pass a high level voltage signal upon the simultaneous occurrence of a high voltage signal from the cell 120 and a pulse from the trigger circuit 130.

The output of the AND gate 126 is coupled to a current generator 132 while the output of the AND gate 128 is coupled to a current generator 134. The current generators 132 and 134 are arranged to respond to a high voltage signal passed by the associated AND gates 126 and 128 to generate current signals of sufficient magnitude to produce a switching of the direction of flux within a word twistor 34.

Coupled to the output of the current generator 132 is a conductor 136. The conductor 136 passes in a like direction about the twistors 34 and 36 and over a segment of the helical portion of the A level of each word twistor 34 similar to the conductor 24 illustrated in FIGURE 1.

Coupled to the output of the current generator 134 is a conductor 138. Similar to the conductor 136, the conductor 138 also passes in a like direction about each of the twistors 34 and 36 and over a segment of the helical portion of the B level of each word twistor 34.

In this arrangement, current signals generated by the current generators 132 and 134 produce upward axial magnetic fields within the word twistors 34 of sufficient magnitude to cause magnetic flux within the segment of the helical portions about the conductors 136 and 138 to assume a clockwise helical direction. Similarly, the current signals generated by the current generators 132 and 134 also produce magnetic fields within segments of each of the bias twistors 36 to set flux within the segments in a clockwise helical direction. If the current generated by either of the current generators 132 or 134 produces a reversal of the direction of flux within a segment of a twistor, a voltage of predetermined magnitude is developed within the associated central conductor of the twistor and appears at the associated sense amplifier 46. If the current signals generated by the current generators 132 and 134 do not produce a reversal of magnetic flux within the twistors only a small noise signal is developed.

In operation, the cell 120 combines with the AND gates 126 and 128 and the current generators 132 and 134 to selectively excite one of the current generators at a given time depending upon the binary value of the input bit applied thereto. For example, if the input bit is of a binary one value the output lead 124 is energized to a high voltage level. Simultaneous with the triggering of the trigger circuit 130, the AND gate 128 is then energized to in turn excite the current generator 134. Thus, in response to an input bit of a binary one value the current generator 134 is excited to pass a current through the conductor 138 about the twistors 34 and 36. A similar operation occurs for the cell 120, and AND gate 122 and the current generator 132 in response to an input bit of a binary zero value. Thus, in response to an input bit of a binary zero value a current signal is passed by the conductor 136 about the twistors 34 and 36.

Figure 4:
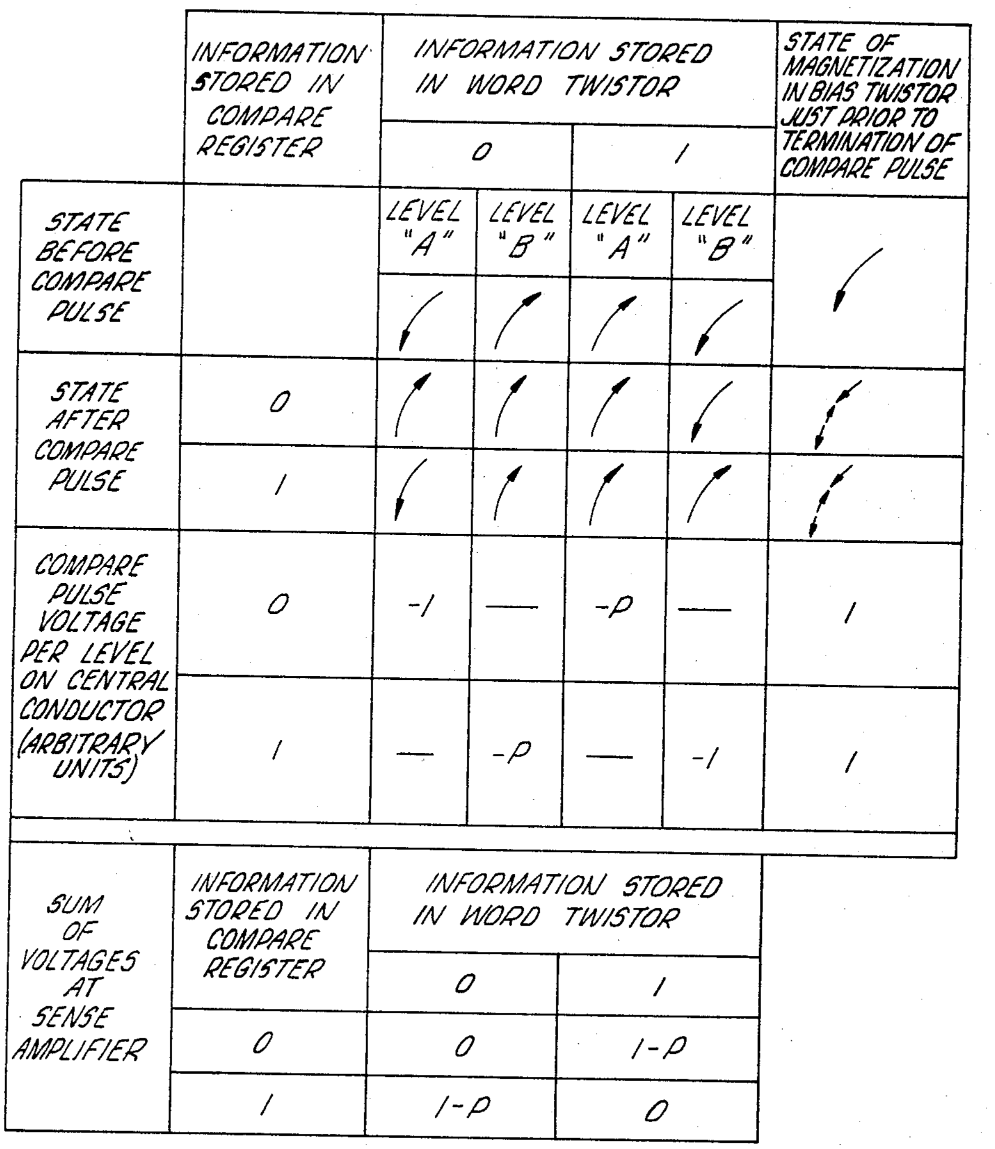
FIGURE 4 is a chart depicting the relative directions of magnetization within the twistors illustrated in FIGURE 2 and a corresponding representation of the voltages developed thereby.

The operation of the cell 120 and its associated circuitry, in simultaneously comparing a bit of binary information with an associated bit stored in each of the word storing twistors may be most clearly understood by reference to the chart of FIGURE 4. For example, when a binary one is stored by a pair of helical portions of a word twistor 34 and an input bit of a binary one value is applied to an associated cell of the compare register 118 a current signal is generated in the conductor 138 which produces a reversal of flux within the B level for the twistor 34 to produce a voltage signal of predetermined magnitude (−1 in arbitrary units) within the associated conductor 38. If a binary zero were stored within the pair of helical portions only a noise signal (−P) would be generated upon receipt of the input bit of binary one value. The reverse results occur when the input bit is of a binary zero value. Thus, as indicated by the chart of FIGURE 4, when a match occurs between a bit of binary information stored within a word twistor 34 and a bit of the binary coded input word, a voltage signal of predetermined magnitude is developed within the conductor of the associated twistor while if a mismatch occurs only a noise signal is developed.

In the bias twistor 36, however, since the preset condition is opposite to the preset condition of the word twistors, when one of the current generators 132 and 134 is excited, a current signal is passed about the bias twistors in a direction which produces a reversal of flux in a segment of the bias twistors and the generation of a voltage signal in each bias twistor which is equal in magnitude and opposite in polarity to the predetermined voltage developed in the conductor of the word twistor upon a match between the bit of information stored therein and the associated bit of the input word. Since each bias twistor 36 is connected in series with its associated word twistor 34, the voltages developed in the bias twistor are added to the voltages developed in the conductor 38 of the word twistor. In this manner, for each bit of a word stored within a word twistor a summation of voltages occurs within the series connected central conductors as indicated by the chart of FIGURE 4. Accordingly, upon a summation of the voltage signals developed in a word and bias twistor, a discrete output voltage is developed at the associated sense amplifier (namely, zero volts) when an exact match occurs between the binary coded bit stored in the word twistor and the binary coded input bit applied to the associated cell of the compare register 118.

The above-described operation for the cell 120 and its associated circuitry to simultaneously compare a bit of binary information with a corresponding stored bit of information in each word storing twistor 34 occurs for each cell of the register 118 in response to a binary coded input word. Thus, for example, if it is desired to locate the position of the binary coded word 101 in the comparing circuit, the binary coded input word 101 is applied to the compare register 118 from the data processor simultaneous to an input signal being applied to the trigger circuit 130. In response to the binary coded input word 101, the cells of the register 118 function together with the associated AND gates and current generators to pass current signals through the conductors 138, 136′ and 138″ about the twistors 34 and 36 comprising each of its twistor pairs 28, 30 and 32. In the pair of twistors 28 a match occurs between each bit of information stored in the word storing twistors 34 and each bit of the binary coded input word. Accordingly, following the chart of FIGURE 4 a discrete output voltage signal is developed at the sense amplifier 46 to indicate a match between the binary coded word stored in the word storing twistor 34 and the binary coded input word applied to the compare register 118. Assuming the binary words other than 101 are stored in the other pair of twistors 30 and 32, the voltage signals developed at the associated sense amplifiers 46' and 46'' differ from the discrete output voltage signal and therefore provide an indication that the word 101 is not stored in the associated word storing twistors.

Thus, the comparing circuit of the present invention functions to directly locate the position of the particular binary coded word stored in the plurality of twistors by simultaneously comparing the stored words with an input signal corresponding to the particular binary coded word to generate a discrete location output signal at the sense amplifier where the particular coded word is stored.

Such a comparing circuit is particularly useful in combination with a memory storage to provide a direct access storage apparatus of the type described in the aforementioned co-pending patent application. In such an arrangement the discrete location output pulse also provides a direct indication of the location of the binary coded information stored in the memory storage.

In the comparing circuit of the present invention, a simultaneous comparing operation may take place without destroying or varying the word content of the comparing circuit. This is due to the particular arrangement of the conductors 136 and 138 as described in detail in connection with FIGURE 1. In particular, the conductors 136 and 138 are relatively narrow strips of conductive material, single wires, or a solenoid, and pass only over a segment of the helical portions previously magnetized to store a bit of binary coded information in a word twistor. Current signals applied to the conductors 136 and 138 therefore only effect the direction of magnetic flux over a small segment of the helical portion. At the cessation of the current signals the magnetization of the helical portions about the segment is sufficient to cause the magnetic flux within the segment to be re-oriented in common with the remaining direction of magnetization of the helical portion.

To aid in the realigning of magnetic flux within a segment of a helical portion the current signal generated by the current generators 132 and 134 may have a waveform similar to that illustrated in FIGURE 3. Thus, as described briefly in connection with FIGURE 1, during the compare portion of the current signal the direction of flux within the segment is reversed while during the post-compare portion an axial magnetic flux is developed in a direction to aid the helical portions adjacent the segment in re-orienting the direction of flux within the segment.

Thus, since the comparing operation of the present invention does not destroy or vary the word content stored within the comparing circuit, the comparing operation may be repeated over and over again without rewriting the information stored in the comparing circuit. However, if at any time it is desired to rewrite information within a word twistor of the comparing circuit, the preset current generator is excited and the writing operation for the particular word twistor repeated in the manner described above. Thus, while the contents of the comparing circuit are not effected by the actual comparing operation it may be readily changed under the control of the data processor.

In certain embodiments of the comparing circuit of the present invention it may be desirable to provide a form of isolation between the actual writing circuits for the twistors and the sensing circuits for sensing the output voltages developed in the word and bias twistors. Such an arrangement for a single twistor pair is illustrated in FIGURE 5.

Figure 5:
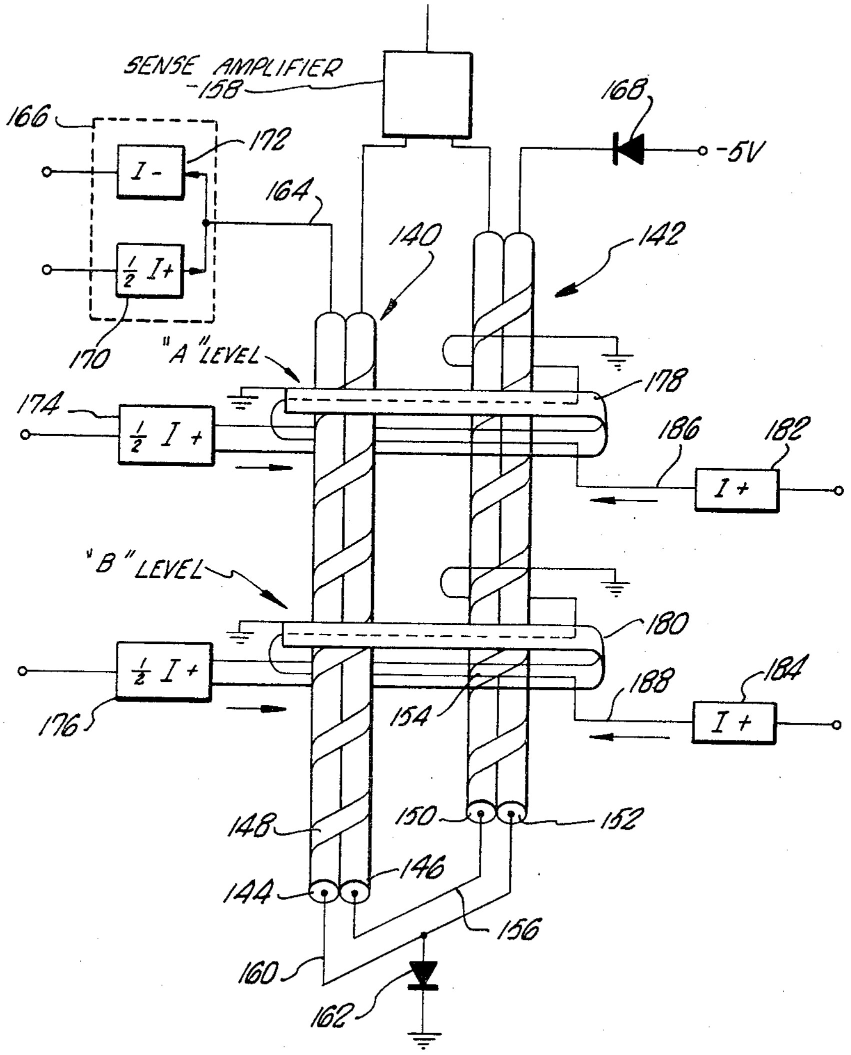
FIGURE 5 is a diagrammatic representation of another form of the storage apparatus of the present invention.

Although the comparing circuit arrangement illustrated in FIGURE 5 includes only a single pair of twistors and means for writing into and comparing a single bit of binary information, it is to be understood that the principles of the apparatus of FIGURE 5 may be readily applied to a larger comparing circuit arrangement such as illustrated in FIGURE 2 and is shown in a basic form only for means of clarity and simplicity of understanding.

The twistor pair illustrated in FIGURE 5 includes a word storing twistor 140 and a bias twistor 142. The word storing twistor includes a pair of central conductors 144 and 146. By way of example only, the central conductors 144 and 146 are illustrated as being longitudinally adjacent each other. Other configurations are possible. For example, one of the conductors may be hollow and shaped to longitudinally receive the other conductor, or the conductors 130 and 132 may be cross-sectionally shaped such that when positioned adjacent each other they form a cylinder.

The word storing twistor 140 also includes a strip of magnetic material 148 helically wound around the conductors 144 and 146 as illustrated.

The bias twistor 142 includes a pair of central conductors 150 and 152. The central conductors 150 and 152 may be arranged in any of the aforementioned manners and by way of example only are illustrated as being longitudinally adjacent each other similar to the conductors 144 and 146. The bias twistor 142 also includes a strip of magnetic material 154 helically wound around the conductors 150 and 152.

A lower end of the conductor 146 is coupled by a lead 156 to the lower end of the conductor 150 while the upper ends of the conductors 146 and 150 are coupled to the inputs of a sense amplifier 158. In this manner, the central conductors 146 and 150 are connected in a series circuit and the sense amplifier is arranged to sense any voltage signals developed across the series circuit.

The lower end of the conductor 144 is coupled by a lead 160 to the lower end of the conductor 152 and to ground through a diode 162. The upper end of the conductor 144 is coupled to an output lead 164 of a half-write and preset unit 166. The upper end of the conductor 152 is coupled to the cathode of a diode 168 having its anode coupled to a source of negative potential (−5 volts).

The half-write and preset unit 166 includes a half-write current generator 170 and a preset current generator 172. The unit 166 possesses an extremely high input impedance when in a nonconductive state and a low input impedance when in a conductive state. When the preset current generator 172 is nonconductive or the half-write current generator 170 is conductive, the diode 168 is back biased.

Similar to the circuit illustrated in FIGURE 2, the comparing circuit of FIGURE 5 also includes a pair of half-write current generators 174 and 176 having their outputs coupled to conductive strips or solenoids 178 and 180, respectively. The current generators 174 and 176 together with their associated conductive strips are associated with A and B levels of the pair of twistors 140 and 142 and combine with the half-write current generator 170 to store a bit of binary coded information in the word storing twistor 140 by selectively setting magnetic flux in opposite directions along a pair of helical portions of the twistor 140.

In particular, considering the over-all writing operation of the comparing circuit illustrated in FIGURE 5, the preset current generator 172 is first energized to switch to a conductive state. In its conductive state, the preset current generator forward biases the diode 168, back biases the diode 162, and causes a large current to flow from the source of negative potential through the diode 168 and the conductor 152 upward through the conductor 144 to the preset current generator 172. The current signal is of sufficient magnitude to cause magnetic flux to be set in a downward counter-clockwise helical direction about the conductors 152 and 150 and in an upward clockwise helical direction about the conductors 144 and 146 of the word storing twistor 140. At the termination of the preset current, the magnetic flux remains in its preset direction.

The half-write current generator 170 and one of the half-write current generators 174 and 176 are then energized. Energizing of the half-write current generator 170 forward biases the diode 162 and causes a current signal to flow from the half-write current generator 170 through the conductor 144 to ground through the forward biased diode 162. The current signal generated by the current generator 170 produces a circular magnetic field about the conductors 144 and 146 of the twistor 140. The energizing of either of the half-write current generators 174 or 176 produces a current flow around the conductors 144 and 146 to produce a downward axial magnetic field in the conductors 144 and 146. The circular and axial magnetic fields are insufficient in themselves to produce a change in the direction of the magnetic flux in the twistor 140. However, by the simultaneous energizing of the half-write current generator 170 and either the half-write current generator 174 or the generator 176, the circular and axial magnetic fields combine to produce a resultant magnetic field sufficient to produce a selective switching of magnetic flux along a helical portion of the conductors 144 and 146 about the A or B levels of the twistor 140 depending upon which of the half-write current generators 174 or 176 is energized.

The mode of writing particular bits of coded information into the word storing twistor 140 may be the same as previously described for each A and B levels of the comparing circuit of FIGURE 2. Therefore, to store a binary zero in the twistor 140, the current generators 170 and 174 may be simultaneously energized to cause a switching of flux along the helical portion of the A level in the twistor 140. Similarly, to store a binary one in the word storing twistor 140, the current generators 170 and 176 are simultaneously energized to switch the direction of magnetic flux along a helical portion in the B level of the word storing twistor 140. Thus, a binary zero is represented by a relative downward counter-clockwise direction of magnetic flux in the A level and a relative upward clockwise direction of magnetic flux in the B level while a binary one is represented by a relative upward clockwise direction of magnetic flux in the A level and a relative downward counter-clockwise direction of magnetic flux in the B level.

Similar to the circuit of FIGURE 2, the comparing circuit of FIGURE 5 also includes means for comparing a binary coded bit of input information with the binary coded bit of information stored in the twistor 140 to generate a discrete outward voltage when a match occurs between the input and stored information. In FIGURE 5, such means includes a pair of current generators 182 and 184. The current generator 182 is associated with the A level of the twistor 140 while the current generator 184 is associated with the B level. Coupled to the output of the current generator 182 is a relatively thin conductive strip, solenoid or conductor 186. The conductor 186 passes around the twistor 140 and over a segment of the helical portion associated with the A level. The conductor 186 passes in a like direction about the conductors 150 and 152 of the bias twistor 142. Similarly, coupled to the output of the current generator 184 is a relatively thin conductive strip, solenoid or conductor 188. The conductor 188 passes around the twistor 140 and over a segment of the helical portion associated with the B level thereof and in a like direction about the conductors 150 and 152 of the bias twistor 142. The conductors 186 and 188 are arranged to pass current signals about the twistors 140 and 142 and to produce an upward axial magnetic field within the conductors of the twistors 140 and 142. The strength of the upward axial magnetic field is sufficient to switch the direction of the magnetic flux over a segment of the helical portions associated therewith to a relative upward counter-clockwise direction both in the word storing twistor 140 and in the bias twistor 142.

The energizing of the current generators 182 and 184 to produce such switching of magnetic flux is controlled by a compare register (not shown) similar to that described in connection with FIGURE 2. Accordingly, if a binary coded input bit is of a binary zero value the current generator 182 is excited to produce a current signal which passes over a segment of the helical portion associated with the A level. If a binary zero is stored within the twistor 140, the current passing along the conductor 186 produces an upward switching of the direction of magnetic flux over a segment of the helical portion associated with the A level. The switching of the direction of magnetic flux produces a voltage within the conductor 146 having a predetermined magnitude. The output voltage is sensed by the sense amplifier 158. Simultaneously, the current signal in the conductor 186 also produces a switching of the direction of magnetic flux over a segment of the conductor 150 in the bias twistor 142. The voltage developed in the conductor 150, due to the preset direction of magnetic flux therein, is equal in magnitude and opposite in polarity to the output voltage developed in the conductor 146. Thus, when a binary zero input word is applied to excite the current generator 182 and a binary zero bit is stored in the twistor 140 a discrete output voltage is developed at the sense amplifier 158 indicative of a match condition. If a binary one is stored in the twistor 140 and the input bit is of a binary zero value a noise signal is generated in the conductor 146 and the aforementioned voltage developed in the conductor 150 of the bias twistor 142. This results in other than the aforementioned discrete output voltage at the sense amplifier to indicate a no-match condition.

A similar operation takes place when a binary one input bit is received by the comparing array of FIGURE 5 to energize the current generator 184.

Accordingly, as illustrated by the chart of FIGURE 4, in the comparing circuit of FIGURE 5, when the bit of binary information stored in the twistor 140 exactly matches the binary input bit a discrete output voltage signal is developed indicative of the match condition. Thus, although the arrangement illustrated in FIGURE 5 provides isolation between the write and sense portions of the twistors 140 and 142, the over-all general operation thereof is the same as that of a twistor pair in the comparing circuit illustrated in FIGURE 2. Accordingly, twistor pairs such as illustrated in FIGURE 5 may be substituted for the twistor pairs such as 28 in FIGURE 2 to provide a preferred form of the over-all comparing circuit of the present invention.

Similar to the comparing circuit illustrated in FIGURE 2, the comparing arrangement of FIGURE 5 also provides for simultaneous comparing of stored and input information without destroying or varying the content of the comparing apparatus. This is due to the arrangement of the conductors 186 and 188 relative to the wide conductive strips or solenoids 178 and 180 to provide means for selectively reversing the direction of magnetic flux only over segments of the helical portions previously set by current signals passing through the conductive strips 178 and 180. Thus, when the twistor pairs of FIGURE 5 are included in a larger array, the over-all comparing circuit allows for repeated simultaneous comparing of all words stored therein with binary coded input words without changing or varying the content stored in the array and without requiring a re-writing of word information into the comparing circuit after each comparing operation.

What is claimed is:

1. In a magnetic storage apparatus, the combination of:

a twistor having a central electrical conductor;

first binary input means for selectively setting magnetic flux in opposite directions along first and second helical portions of the conductor to store a bit of binary coded information in the twistor;

and second binary input means responsive to a binary coded input signal for passing a current signal about the conductor over a segment of one of the helical portions in response to a signal of a binary one value and over a segment of the other helical portion in response to a signal of a binary zero value to produce a voltage signal of predetermined magnitude in the conductor when a match exists between the value of the binary coded input signal and the bit of binary information stored in the twistor.

2. In a magnetic storage apparatus, the combination of:

a twistor having a central electrical conductor;

first binary input means for selectively setting magnetic flux in opposite directions along first and second helical portions of the conductor to store a bit of binary coded information in the twistor;

second binary input means responsive to a binary coded input signal for passing a current signal about the conductor over a segment of one of the helical portions in response to a signal of a binary one value and over a segment of the other helical portion in response to a signal of a binary zero value to produce a voltage signal of predetermined magnitude in the conductor when a match exists between the value of the binary coded input signal and the bit of binary information stored in the twistor;

and means coupled in a series circuit relationship with the conductor and responsive to the binary input signal for generating a voltage signal which is equal in magnitude and opposite in polarity to the predetermined voltage signal such that a discrete output voltage signal is developed across the series circuit only when an exact match occurs between the binary value of the input signal and the bit of binary information stored in the twistor.

3. The apparatus defined in claim 2 wherein the series connected means includes a second twistor having an electrical conductor connected in series with the electrical conductor of the first mentioned twistor, magnetic flux being set in a predetermined direction in the second twistor, the second twistor being arranged such that the current signals developed by the second binary input means pass therearound.

4. In a magnetic storage apparatus, the combination of:

a twistor including an electrical conductor;

first binary input means for selectively setting the direction of magnetic flux along first and second helical portions of the conductor to store a bit of binary coded information in the twistor;

and second binary input means responsive to a binary coded input signal for applying a magnetomotive force to one of the portions and for momentarily switching the direction of flux in a segment of the one portion when a match occurs between the binary value of the input signal and the bit of binary information stored in the twistor.

5. A magnetic storage apparatus, comprising:

a twistor having an electrical conductor;

first binary input means for selectively setting the direction of magnetic flux along first and second helical portions of the conductor to store a bit of binary coded information in the twistor;

second binary input means responsive to a binary coded input signal for passing a current signal about the conductor over one of the helical portions to produce a voltage signal of predetermined magnitude in the conductor when a match occurs between the bit of binary information stored in the twistor and the binary value of the input signal;

means coupled in series with the conductor and responsive to the second binary input means for generating a voltage of equal magnitude and opposite polarity to the predetermined voltage;

and output means coupled to the conductor and the series coupled means.

6. In a magnetic storage apparatus, the combination of:

a twistor having a central electrical conductor;

first binary input means for selectively setting the direction of magnetic flux along a helical portion of the conductor to store a bit of binary information in the twistor;

second binary input means responsive to a binary input signal for switching the direction of magnetic flux over a segment of the helical portion to generate a voltage signal of predetermined value in the conductor when a match occurs between a binary value of the input signal and the bit of binary information stored in the twistor;

and means coupled in series circuit relationship with the conductor and responsive to the binary input signal for generating the voltage signal in series with the predetermined voltage which is equal in magnitude and opposite in polarity to the predetermined voltage signal such that a discrete voltage signal is developed across the series circuit only when an exact match occurs between the binary value of the input signal and the bit of binary information stored in the twistor.

7. In a magnetic storage apparatus, the combination of:

a twistor having a central conductor;

first binary input means including first and second conductive strips passing over different portions of the twistor conductor for setting the direction of flux along first and second helical portions of the twistor conductor in opposite directions to store a bit of binary information in the twistor;

and second binary input means responsive to a binary coded input signal and including first and second electrical conductors, the first electrical conductor being arranged to pass a current signal about the twistor conductor over a segment of one of the helical portions in response to an input signal of a binary one value, the second electrical conductor being arranged to pass a current signal about the twistor conductor over a segment of the other helical portion in response to an input signal of a binary zero value to develop a voltage signal of predetermined magnitude in the twistor conductor when a match exists between the binary value of the input signal and the bit of binary information stored in the twistor.

8. A magnetic storage apparatus, comprising:

a first twistor having an electrical conductor;

a second twistor having an electrical conductor coupled in series with the electrical conductor of the first twistor;

output means coupled between the free ends of the electrical conductors of the first and second twistors;

means for presetting the direction of magnetic flux in the second twistor;

first binary input means for selectively setting magnetic flux in opposite directions along first and second helical portions of the conductor of the first twistor to store a bit of binary information in the first twistor;

and second binary input means responsive to a binary coded input signal for passing a current signal about the conductors of the first and second twistors over a segment of one of the helical portions in response to a signal of a binary one value and about the conductors of the first and second twistors and over a segment of the other helical portion in response to a signal of a binary zero value to develop a discrete output voltage at the output means when a match exists between the binary value of the input signal and the bit of binary informaton stored in the first twistor.

9. A magnetic storage apparatus, comprising:

a first twistor having an electrical conductor;

a second twistor having an electrical conductor coupled in series with the electrical conductor of the first twistor;

output means coupled between the free ends of the electrical conductors of the first and second twistors;

means for presetting the direction of magnetic flux in the first and second twistors in opposite directions;

first binary input means for selectively reversing the direction of magnetic flux along one of two helical portions in the conductor of the first twistor to store a bit of binary coded information in the first twistor;

and second binary input means responsive to a binary coded input signal for passing a current signal in a like direction about the conductors of the first and second twistors and over a segment of one of the helical portions in response to an input signal of a binary one value and about the conductors of the first and second twistors in a like direction and over a segment of the other helical portion in response to an input signal of a binary zero value to switch the direction of flux within a segment of a helical portion and a segment of the conductor of the second twistor to develop a discrete output voltage at the output means only when a match exists between the binary value of the input signal and the bit of binary information stored in the first twistor.

10. In a magnetic storage arrangement, the combination of:

a twistor having a central conductor;

first binary input means for setting magnetic flux in opposite directions along a plurality of pairs of helical portions of the conductor to store a binary coded word of information in the twistor each bit of which is stored by a different pair of helical portions;

and second binary input means responsive to a binary coded input word each bit of which is associated with a different bit of the word stored in the twistor and including means for passing a current signal about one of the helical portions of each pair of helical portions storing a bit associated with a bit of the input word such that a plurality of voltages of predetermined magnitudes are deveolped in the conductor one for each pair of helical portions in which a match exists between the binary value of the bits stored therein and the binary value of the associated bit of the input word.

11. In a magnetic storage apparatus, the combination of:

a twistor having a central conductor;

first binary input means for setting magnetic flux in opposite directions along a plurality of pairs of helical portions of the conductor to store a binary coded word of information in the twistor, each bit of the word being stored by a different pair of helical portions;

and second binary input means responsive to a binary coded input word each bit of which is associated with a different bit of the word stored in the twistor and including for each bit of the input word means for passing a current signal about the conductor over a segment of one of the helical portions storing an associated bit in the twistor when the bit of the input word is of a binary one value and for passing a current signal about the conductor and over a segment of the other helical portion storing the associated bit in the twistor when the bit of the input word is a binary zero value to produce voltage signals of predetermined magnitudes in the conductor one for each bit of the word stored therein in which a match exists between the binary value of the bit of the input word and the binary value of the associated bits stored in the twistor such that a discrete output voltage is developed in the conductor when the input word exactly matches the word stored in the twistor.

12. In a magnetic storage apparatus, the combination of:

a twistor having a central conductor;

first binary input means for storing magnetic flux in opposite directions along a plurality of pairs of helical portions of the conductor to store a binary coded word in the twistor each bit of which is stored within a different pair of helical portions;

second binary input means responsive to a binary coded input word each bit of which is associated with a different bit of the word stored in the twistor and including for each bit of the input word means for passing a current signal about the conductor over a segment of one of the helical portions storing an associated bit in the twistor when the bit of the input word is of a binary one value and for passing a current signal about the conductor and over a segment of the other helical portion storing the associated bit in the twistor when the bit of the input word is of a binary zero value to produce voltage signals of predetermined magnitudes in the conductor one for each bit of the word stored therein in which a match exists between the binary value of the bit of the input word and the binary value of the associated bit stored in the twistor;

and means coupled in series circuit relationship with the conductor and responsive to the binary coded input word for developing a plurality of voltages, one for each bit in the input word, each voltage being equal in magnitude and opposite in polarity to the voltage developed for the associated bit in the twistor when a match exists between the bit in the twistor and the associated bit of the input word such that a discrete output voltage is developed across the series circuit when the input word exactly matches the word stored in the twistor.

13. A magnetic storage apparatus, comprising:

a first twistor having a central conductor;

a second twistor having a central conductor coupled in series with the central conductor of the first twistor;

output means coupled between the free ends of the central conductors of the first and second twistors;

means for presetting the direction of magnetic flux in the second twistor;

first binary input means for setting magnetic flux in opposite directions along a plurality of pairs of helical portions of the conductor of the first twistor to store a binary coded word in the twistor each bit of which is stored by a different pair of helical portions;

and second binary input means responsive to a binary coded input word each bit of which is associated with a different bit of the word stored in the first twistor and including for each bit in the input word means for passing a current signal about the conductors of the first and second twistors and over a segment of one of the helical portions associated with the bit to generate in the conductor of the first twistor a voltage signal of predetermined magnitude when a match occurs between the bit of the input word and the associated bit stored in the twistor and to generate in the conductor of the second twistor a voltage equal in magnitude and opposite in polarity to the voltage developed in the conductor of the first twistor when said match occurs such that a discrete output voltage is developed at the output means when an exact match occurs between the binary value of the input word and the binary value of the word stored in the first twistor.

14. A magnetic storage apparatus, comprising:

a first twistor having a central conductor;

a second twistor having a central conductor coupled in series with the central conductor of the first twistor;

output means coupled between the free ends of the central conductors of the first and second twistors;

means for presetting the direction of magnetic flux in the first and second twistors in opposite directions;

first binary input means for selectively reversing the direction of magnetic flux along one of two helical portions in each of a plurality of pairs of helical portions in the conductor of the first twistor to store a binary coded word in the first twistor each bit of which is stored with a different pair of helical portions;

and second binary input means responsive to a binary coded input word each bit of which is associated with a different bit of the word stored in the first twistor and including for each bit of the input word means for passing a current signal in a like direction about the conductors of the first and second twistors and over a segment of one of the helical portions storing an associated bit in the first twistor when the bit of the input word is of a binary one value and for passing a current signal in a like direction about the conductors of the first and second twistors and over a segment of the other helical portion storing the associated bit in the first twisor when the bit of the input word is of a binary zero value to generate in the conductor of the first twistor a voltage signal of predetermined magnitude when a match occurs between the bit of the input word and the associated bit stored in the twistor and to generate in the conductor of the second twistor a voltage equal in magnitude and opposite in polarity to the voltage developed in the first conductor when said match occurs such that a discrete output voltage is developed at the output means only when an exact match exists between the binary value of the input word and the binary value of the word stored in the twistor.

15. In a magnetic storage apparatus, the combination of:

a plurality of twistors each having a central conductor;

first binary input means for selectively setting magnetic flux in opposite directions along a plurality of pairs of helical portions of each conductor to store a binary coded word in each twistor each bit of which is stored by a different pair of helical portions;

and second binary input means responsive to a binary coded input word each bit of which is associated with a different bit in each of the words stored in the twistors and including for each bit in the input word selectively operable means for passing a current signal about the conductors and over a segment of one of the pair of helical portions of each twistor associated with the bit to produce voltage signals of predetermined magnitudes in the conductor of each twistor one for each bit of the word stored therein in which a match exists between the binary value of the bit of the input word and the binary value of the associated bit stored in the twistor such that a discrete output voltage is developed in the conductor of each twistor in which an exact match occurs between the words stored therein and the input word.

16. In a magnetic storage apparatus, the combination of:

a plurality of twistors each having a central conductor;

first binary input means for selectively setting magnetic flux in opposite directions along a plurality of pairs of helical portions of each conductor to store a binary coded word in each twistor each bit of which is stored by a different pair of helical portions;

second binary input means responsive to a binary coded input word each bit of which is associated with a different bit in each of the words stored in the twistors and including for each bit in the input word means for passing a current signal about the conductors and over a segment of one of the helical portions of each pair associated with the bit to produce voltage signals of predetermined magnitudes in the conductor of each twistor one for each bit of the word stored therein which matches the binary value of its associated bit in the input word;

and a plurality of separate means one coupled in series circuit relationship with each of the conductors, each separate means being responsive to the binary coded input word for developing a plurality of voltages, one for each bit of the input word, each voltage being equal in magnitude and opposite in polarity to the voltage developed within the series connected conductor when a match exists between the associated bit of the input word and a bit stored in the series connected conductor.

17. A magnetic storage apparatus, comprising:

a plurality of pairs of first and second twistors having series connected central conductors;

means for presetting the direction of magnetic flux in the conductor of each second twistor;

a plurality of output means each coupled across the series connected conductors of a different pair of first and second twistors;

first binary input means for selectively setting magnetic flux in opposite directions along a plurality of pairs of helical portions of the conductor of each first twistor to store a binary coded word in each first twistor each bit of which is stored by a different pair of helical portions;

and second binary input means responsive to a binary coded input word each bit of which is associated with a different bit in each of the words stored in the first twistor of each pair of twistors and including for each bit in the input word means for passing a current signal about the conductor of each twistor and over a segment of one of the helical portions associated with the bit to generate in the conductor of each first twistor a voltage signal of predetermined magnitude when a match exists between the bit of the input word and the associated bit stored in the first twistor and to generate in the conductor of each second twistor a voltage equal in magnitude and opposite in polarity to the voltage developed in the conductor of the associated first twistor when said match occurs such that a discrete output voltage is developed in each output means for which an exact match occurs between the binary value of the input word and the binary value of the word stored in its associated first twistor.

18. A magnetic storage apparatus, comprising:

a first twistor including a first conductor and a second conductor positioned longitudinally adjacent each other and a strip of magnetic material helically wound around the conductors;

a second twistor including a first conductor and a second conductor positioned longitudinally adjacent each other and a strip of magnetic material helically wound around the pair of conductors for the second twistor;

means for coupling the first conductor of the first twistor in series circuit relationship with the first conductor of the second twistor;

output means coupled across the series circuit of the first conductor of the first twistor and the first conductor of the second twistor;

means for electrically coupling the second conductor of the first twistor in series circuit relationship with the second conductor of the second twistor;

means for presetting the direction of magnetic flux in the second twistor including means for passing a current signal through the second conductor of the second twistor;

first binary input means for setting magnetic flux in opposite directions along first and second helical portions of the first twistor to store a bit of binary coded information in the first twistor and including means for passing a current signal through the second conductor of the first twistor;

and second binary input means responsive to a binary coded input signal for passing a current signal about the first and second twistors and over a segment of one of the helical portions to develop a voltage signal of predetermined magnitude in the first conductor of the first twistor when a match exists between the binary value of the input signal and the bit of binary information stored in the first twistor and to develop a voltage signal in the first conductor of the second twistor having a magnitude and polarity opposite to the voltage developed in the first conductor of the first twistor when said match occurs such that a discrete output voltage is developed at the output means when the binary input signal exactly matches the bit of information stored in the first twistor.

19. A magnetic storage apparatus comprising:

a plurality of non-destructive twistor memory cells arranged in a preselected pattern of information groups with each group storing a binary coded word:

circuit means for substantially simultaneously applying to each information group signals representative of a binary coded information word to be compared with the words stored in the groups, each memory cell of the groups having applied thereto the signal manifesting the binary character of the word being compared which corresponds to the character stored in the cell, and for generating output signals in accordance with the relative binary values of the information word being compared and the stored information words whereby a unique composite output signal generated for an entire information group is produced only when the information word under comparison is stored in the information group.

20. A magnetic storage apparatus as defined in claim 19 wherein the twistor memory cells comprise a twistor element having a central element and first and second conductive strips passing over different portions of the twistor conductor for setting the direction of flux along first and second helical portions of the twistor conductor in opposite directions to store different binary information in the first and second helical portions of the twistor element.

21. A magnetic storage apparatus comprising:

a plurality of twistor memory cells arranged in a preselected pattern of information groups, each group storing a binary coded information word;

means for substantially simultaneously applying signals representative of a binary coded input information word to each group for generating output signals from each twistor cell; and means responsive to the generation of output signals for detecting composite output signals for each group and for determining the presence and/or location in the information groups of the binary coded information word responsive to the detection of a unique composite output signal.

22. A magnetic storage apparatus as defined in claim 21 wherein the twistor memory cells comprise magnetic tape insulatively wound on a conductor in an angular relationship to the longitudinal axis of the conductor and a sheet conductor coupled to an elemental area of the magnetic tape.

References Cited

UNITED STATES PATENTS

| | | | |
|---|---|---|---|
| 3,031,650 | 4/1962 | Koerner | 340—174 |
| 2,973,508 | 2/1961 | Chadurjian | 340—174 |
| 3,060,411 | 10/1962 | Smith | 340—174 |
| 3,308,447 | 3/1967 | Valassis | 340—174 |
| 3,105,961 | 10/1963 | Bobeck | 340—174 |
| 3,154,766 | 10/1964 | Bittman | 340—174 |

STANLEY M. URYNOWICZ, Jr., *Primary Examiner.*